United States Patent
Hirayama et al.

(10) Patent No.: US 6,344,132 B1
(45) Date of Patent: *Feb. 5, 2002

(54) APPARATUS FOR STERILIZING A WATER-SOLUBLE LUBRICANT

(75) Inventors: Takayuki Hirayama; Futoshi Sunada; Haruyoshi Mizuta, all of Yokohama; Shusaku Sakata, Tokyo, all of (JP)

(73) Assignee: Nippon Mitsubishi Oil Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/473,410

(22) Filed: Dec. 28, 1999

(30) Foreign Application Priority Data

Dec. 28, 1998 (JP) ............................................. 10-374706

(51) Int. Cl.⁷ ................................................... C25F 1/00
(52) U.S. Cl. ........................................ 205/695; 205/696
(58) Field of Search ................................ 204/252, 263, 204/230.2, 230.5; 205/701, 695, 696

(56) References Cited

U.S. PATENT DOCUMENTS

| 3,453,201 A | * | 7/1969 | Mihara et al. ........... 204/230.5 |
| 4,533,443 A | * | 8/1985 | Wrighton et al. ........... 204/263 |
| 5,876,589 A | * | 3/1999 | Su et al ....................... 205/695 |
| 6,093,307 A | * | 7/2000 | Su et al. ...................... 205/696 |
| 6,110,352 A | * | 8/2000 | Su et al. ...................... 205/696 |

* cited by examiner

*Primary Examiner*—Bruce F. Bell
(74) *Attorney, Agent, or Firm*—Akin, Gump, Strauss, Hauer & Feld, L.L.C.

(57) ABSTRACT

An apparatus for sterilizing a water-soluble lubricant which comprises a container in which an anode and a cathode are arranged and supplied with a voltage, a partition arranged so as to divide said container into a cathode section, into which a water-soluble lubricant is introduced, and an anode section, into which an electrically conductive material is introduced, and a diaphragm provided in at least a portion of the partition such that an electric current flows between said anode and said cathode, the cathode being an electrode generating a substance sterilizing the lubricant.

10 Claims, 12 Drawing Sheets

⇨ Liquid Flow Direction

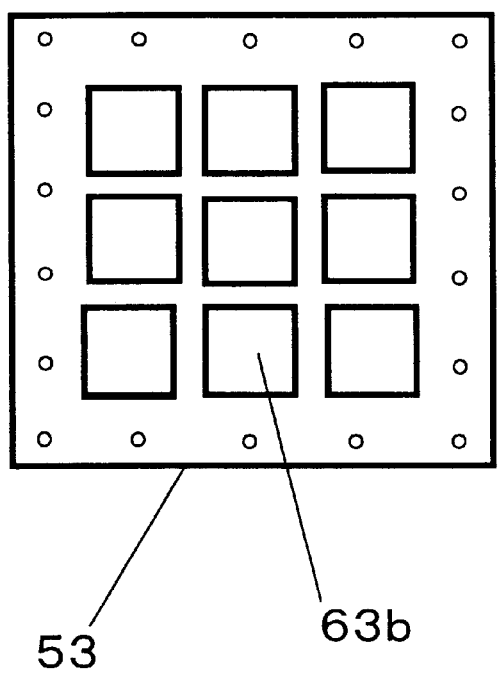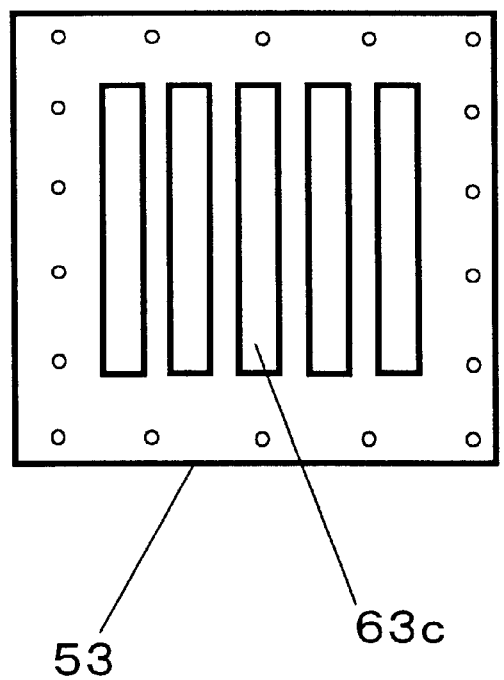

⇨ Liquid Flow Direction

⇒ Liquid Flow Direction

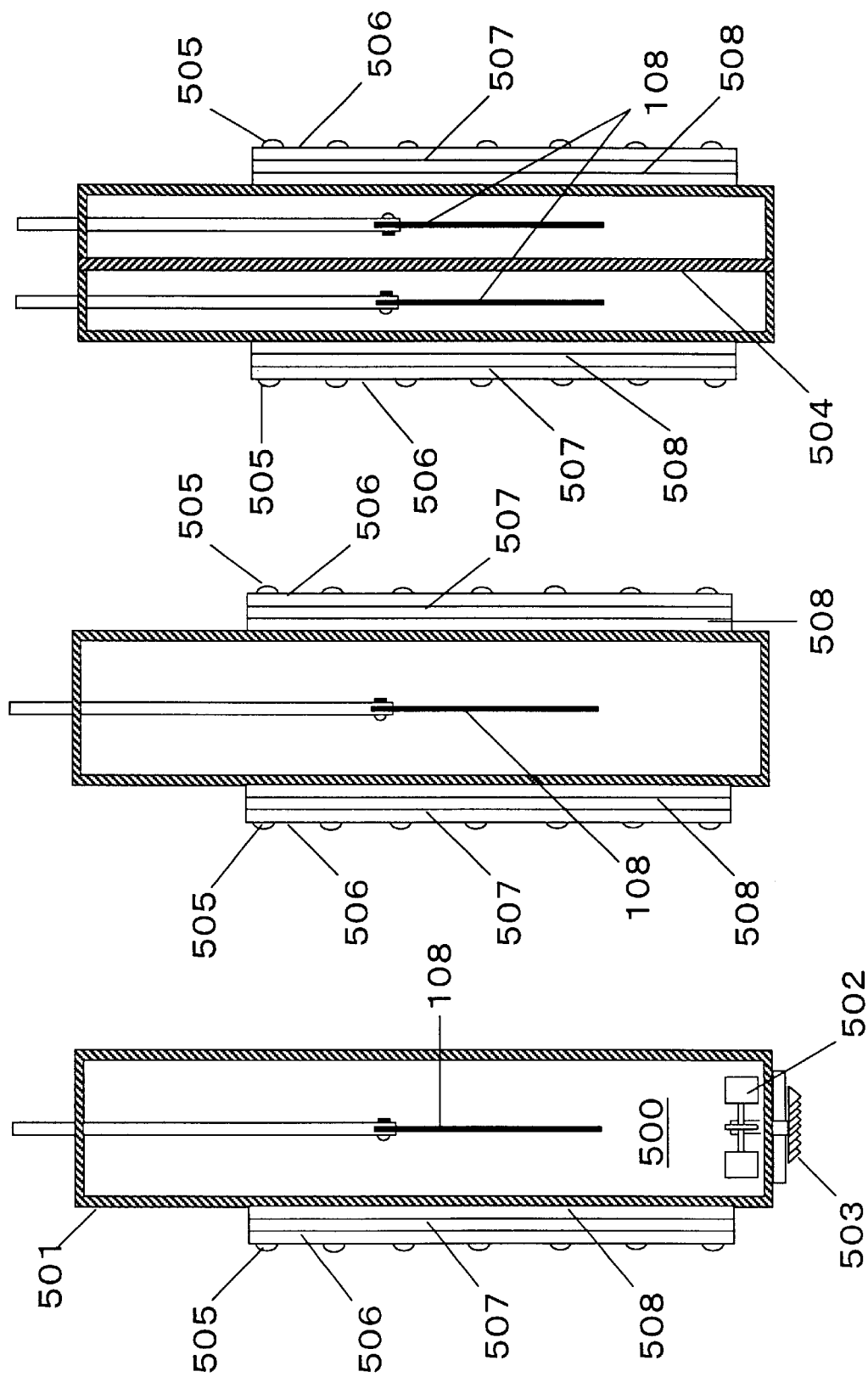

APPARATUS FOR STERILIZING A WATER-SOLUBLE LUBRICANT

BACKGROUND OF THE INVENTION

1. Field of the Invention

This invention relates to an apparatus for sterilizing a water-soluble lubricant used in various machining works.

2. Description of the Prior Art

In many cases, machining works have been done using water-soluble lubricants such as water-soluble cutting oils and water-soluble grinding oils in a grinding or cutting machine. Water-soluble lubricants can be recycled after being purified. In other words, after removal of metal flakes contained in the water-soluble lubricant discharged from a machining apparatus, the lubricant is fed into a tank and then returned to the apparatus for reuse.

Microorganisms and bacteria are prone to proliferate in a water-soluble lubricant circulation system which is open to the air because the lubricant is kept at an increased temperature due to heats developed during machining operations or resulting from an increased atmospheric temperature during the summer season. The proliferated microorganisms cause the lubricant not only to emit rancidity and but also to be reduced in pH. Such pH reduction causes the lubricant to change in appearance such as deteriorated emulsion stability, oil-water separation and discoloration (black), and to be reduced in rust preventing properties and lubricity. For example, it is known that when the colony forming unit in a water-soluble lubricant exceeds $10^5$ to $10^6$ units per milliliter, the lubricant emits rancidity which is originated from anaerobic bacteria. For the purpose of preventing the rancidity emission, sterilizers and antiseptics have been added to a lubricant every few weeks or every time the machining operation is temporarily terminated such as on holidays. Alternatively, some countermeasures have been taken by modifying equipment, such as methods of aerating the tank of a circulation system, blowing steam, spraying an ozone-containing gas, irradiating ultrasonic waves, radial rays or ultraviolet rays and adding a metal cation such as silver ion and copper ion, to the tank. These methods are disclosed in Japanese Patent Laid-Open Publication Nos. 56-95992, 60-115697, 63-245494, 2-212597, 4-264199, 62-215507, 2-29496, 5-230492 and 9-135885, respectively.

However, the use of sterilizers is disadvantageous in that its effects last a short time and it is harmful to the human body. The spraying air or steam is inconvenient in that it is less effective in suppressing the proliferation of microorganisms and is not sufficient in view of long lasting effect. The method of spraying an ozone-containing gas or irradiating radial rays or ultrasonic waves is also disadvantageous in that it adversely affects the emulsion stability of a lubricant to be denaturalized, leading to loses in inherent properties thereof and also increases the costs of facilities and operations. Similarly, the method of irradiating ultraviolet rays and adding a metal cation also suffers the same problem that it is less effective in suppressing the proliferation of microorganisms and causes the elevated equipment and operation costs. Therefore, any of these conventional methods can not be a sufficiently effective measure because of the influence on a lubricant and in an economical view.

A method of sterilizing an aqueous solution is generally known in which a voltage is applied to the solution using electrodes. However, an application of this method to a water-soluble lubricant causes the lubricant not only to lose its inherent performances, resulted from changes in the quality of additives contained therein by an electrical oxidation-reduction reaction but also to be reduced in pH facilitated by hydrogen cations generated when applying a voltage. As a result of this, microorganisms are prone to proliferate.

In view of the foregoings, the object of the present invention is to provide a sterilization apparatus which can perform a stable sterilization of microorganisms and suppress the proliferation thereof, with economical advantages.

SUMMARY OF THE INVENTION

The present inventors applied the hydrogen peroxide on-site formation technology to the present invention. More specifically, it is generally known that the application of a faint voltage using carbon electrodes brings about the following reaction at the cathode, thereby forming a hydrogen peroxide anion, as described in "Kagaku Kogaku", vol. 51, No. 6, p 417–419 (1987), written by Masao Sudo.

$$O_2+H_2O+2e^- \rightarrow HO_2^- +OH^- \quad (1)$$

As disclosed in Japanese Patent Laid-Open Publication No. 61-284591, it is also known that application of a voltage to a cathode chamber in the presence of a redox compound or resin (Q) causes the turn over of the following reactions.

$$Q+nH^+ +ne^- \rightarrow H_nQ \quad (2)$$

$$H_nQ+(n/2)O_2 \rightarrow Q+(n/2)H_2O_2 \quad (3)$$

Furthermore, it is known that when a voltage is applied using a cathodic electrode supporting thereon an electrically conductive polyaniline, the following reactions progress in a cycle, thereby forming hydrogen peroxide as described in Chem. Lett. 1996, p 615, by K. Morita et. al. or ibid, vol. 15, No. 5 (1997).

$$PA+nH^+ +ne^- \rightarrow H_nPA \quad (4)$$

$$H_nPA+(n/2)O_2 \rightarrow PA+(n/2)H_2O_2 \quad (5)$$

However, when anodic and cathodic electrodes are immersed into a water-soluble lubricant and the application of a voltage is continued in order to utilize the above-mentioned reactions, protons generated from the anodic electrode by the following reaction mechanism reduce gradually the pH of a lubricant.

$$2H_2O \rightarrow O_2+4H+4e_- \quad (6)$$

Such pH reduction deteriorates the rust-preventing performances and lubricity of a lubricant and moreover facilitates the proliferation of microorganisms, resulting in an extremely shortened sterilizing effect. Furthermore, an reaction-oxidation reaction always progress on the anode, accompanied with the oxidation decomposition of additives contained in a lubricant. After an extensive research and study, it has been found that the foregoing problems can be solved by isolating an anodic electrode with a diaphragm such that protons hardly flows into the water-soluble lubricant and also the lubricant is avoided from being changed in quality.

According to the present invention, there is provided a sterilizing apparatus which comprises a container, an anode and a cathode arranged therein and supplied with a voltage and a partition arranged so as to divide the container into a cathode section into which a water-soluble lubricant is introduced and an anode section into which an electrically conductive material is introduced and provided at least partially with a diaphragm such that an electric current flows between the anode and the cathode and such that the cathode generates a substance sterilizing the lubricant.

The cathode forming the sterilizing substance is preferably a carbon-based electrode.

The cathode forming the sterilizing substance is preferably an electrode supporting an organic compound having an oxidation-reduction capability.

The cathode forming the sterilizing substance is preferably an electrode supporting a redox resin.

The cathode forming the sterilizing substance is preferably a carbon-based electrode or an electrode supporting an organic compound having an oxidation-reduction capability.

The cathode forming the sterilizing substance is preferably a carbon-based electrode or an electrode supporting a redox resin.

The cathode forming the sterilizing substance is preferably a carbon-based electrode or an electrode supporting an organic compound having an oxidation-reduction capability or supporting a redox resin.

The organic compound having an oxidation-reduction capability is preferably benzoquinone, naphthoquinone, anthraquinone or derivatives thereof.

The redox resin is preferably a quinone-based redox resin.

The redox resin is preferably polyaniline.

The cathode section is preferably provided with an inlet port through which a water-soluble lubricant is introduced and an outlet port through which a sterilized water-soluble lubricant is discharged.

The cathode section is preferably provided with a separator which separates impurities from a water-soluble lubricant with the specific gravity and contacting the separated lubricant with the cathode. The separator can prevent a machine oil and a sliding surface lubricant used in machining operations and floating the upper portion of the lubricant from adhering to the cathode and the diaphragm.

The electrically conductive material is preferably a buffer solution or an alkaline aqueous solution, so as to suppress changes in pH. The anode section is preferably provided with a stirrer such that protons generating from the electrode can be neutralized effectively when the electrically conductive material is charged into the anode section.

If the alkaline aqueous solution leaks from the anode section by some accident, it is very harmful to the human body. Therefore, the alkaline aqueous solution is preferably thickened or gelled as to be formed into a solid electrolyte by adding a thickening or gelling substance. The buffer solution may be thickened or gelled so as to be a solid electrolyte by adding a thickening or gelling substance.

A controlling circuit applying a voltage to the anode and the cathode is preferably provided with a circuit reversing the flow direction of the electric current temporarily. The reversing circuit makes it possible to remove contaminants formed over the surface of the electrode or the diaphragm and prevent the electric current from lowering if it happens.

When a water-soluble lubricant is continuously introduced into the cathode section, the sterilizing substance may not be accumulated in more than certain levels of concentration, on the cathode. This may cause a continuous state in the apparatus which fails to complete sterilization, leading to the proliferation of microorganisms and molds on the cathode during the operation. Finally, the efficiency of the sterilizing substance formed is extremely reduced. In order to accumulate temporarily a high concentration of the sterilizing substance in the cathode section so as to keep the section in a germfree condition, the container is preferably provided with a supplying means which can supply a water-soluble lubricant to the cathode section intermittently every and for a certain period of time.

In order to downsize the container, it is preferred to arrange two diaphragms such that one anode is located at the center of the space therebetween and to arrange two cathodes in sandwich relation to the two diaphragms.

As described above, in the present invention, since a cathode is an electrode forming substance sterilizing a water-soluble lubricant and is separated from an anode with a diaphragm, the protons forming from the anode is prevented from flowing into the lubricant and the sterilizing substance is free from decomposition by the anode, leading to sterilization of the lubricant in a stable manner.

Therefore, the present invention is also economically advantageous.

BRIEF DESCRIPTION OF THE DRAWINGS

FIGS. 3a and 3b show another examples of a supporting plate constituting the anode box as shown in FIG. 2.

FIGS. 8a, 8b and 8c show another examples of an anode box used in the present invention.

DETAILED DESCRIPTION OF THE INVENTION

Figure 1A:
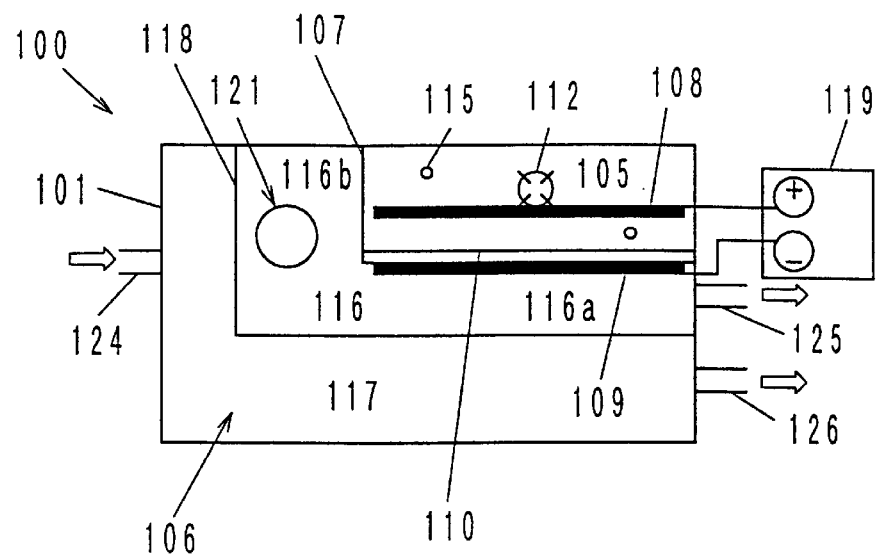
FIGS. 1a and 1b show a sterilizing apparatus of a first embodiment of the present invention and are a top view and a cross-sectional view, respectively.
Figure 1B:
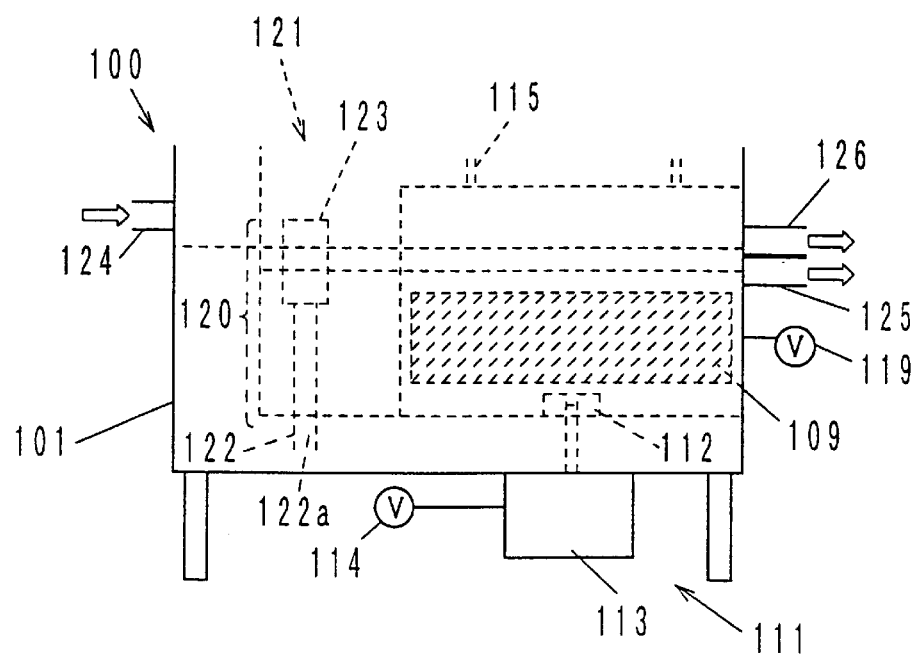
Figure 9:
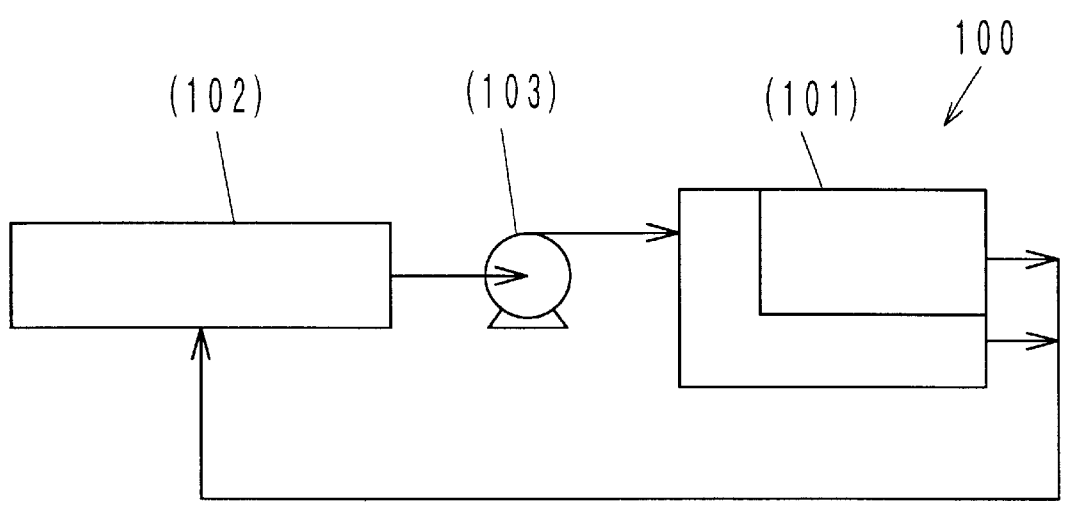
FIG. 9 is a view generally showing an arrangement of the sterilizing apparatus according to the present invention.

Referring now to the drawings and FIGS. 1a and 1b in particular, there is shown a first embodiment of an apparatus for sterilizing a water-soluble lubricant according to the present invention. Indicted by numeral 100 is a sterilizing apparatus of which container indicated by numeral 101 may take any shape and thus may be in the form of a box having a rectangular or square horizontal cross section, as shown in FIGS. 1, 6 and 7 or having a H-shaped horizontal cross section, as shown in FIG. 5. No particular limitation is imposed on the material of the container 101 as long as it has insulation properties and is free from corrosion by a water-soluble lubricant. Such materials are exemplified by polyethylene, polypropylene, polyvinyl chloride, polyacryl and NBR (acrylonitrile butadiene rubber). As shown in FIG. 9, the apparatus 100 is connected via a feeding pump 103 to a storage tank 102 and arranged to sterilize a water-soluble lubricant fed by a pump 103 and then return the sterilized lubricant to the tank 102.

A The term "water-soluble lubricant" used herein denotes a lubricant produced by dispersing, emulsifying or solubilize a mineral base oil, a synthetic base oil, a mixed base oil of two or more of these base oils or an oil containing the mixed base oil and one or more functional additives, to water using an emulsifier. Generally, such lubricants are used as a metal machining oil such as cutting, grinding, rolling, drawing and ironing oils, hydraulic oil and gear coupling oils for industrial use.

As shown in FIG. 1, the interior of the container 101 is sectioned into an anode section 105 and a cathode section 106 by a partition 107 so as to prohibit a lubricant from flowing out and in those sections. The partition 107 may take any shape. For example, in the case where the container 101 is a box-like shape, the partition 107 is formed such that the anode section 105 is located in the corner of the container 101 (upper right hand corner of FIG. 1a) and has a rectangular horizontal cross-section extending in the longitudinal direction of the container 101 and a bottom surface situated apart at a certain height from the bottom surface of the container 101.

Into the anode section 105, an electrically conductive material is introduced and an anode 108 is arranged so as to be immersed into therein.

No particular limitation is imposed on the electrically conductive material as long as it can minimize changes in pH caused by protons formed from the anode 108. For instance, buffer solutions which are alkali in pH and aqueous alkaline solutions may be used. Specific examples of the alkaline buffer solutions are boric acid+potassium chloride+ sodium hydroxide, glycine+sodium hydroxide, borax+ hydrochloric acid, borax+sodium hydroxide, borax+sodium carbonate, hydrochloric acid+sodium carbonate, sodium dihydrogenphosphate+sodium hydroxide, sodium dimethylglycine+hydrochloric acid, borax+potassium chloride+sodium carbonate, sodium carbonate+sodium hydrogencarbonate and sodium dihydrogenphosphate+ potassium dihydrogenphosphate, all of which are set at a pH of 7 or more. The electrolytic concentration of these buffer solution is not restricted as long as they are free from deposition by prolonged application of electric current but is preferably set to 30% or less. The buffer solution may be thickened or gelled by adding a thickening or gelling substance to be used a solid electrolyte.

Eligible aqueous alkaline solutions are those obtained by dissolving a basic inorganic compound such as sodium hydroxide and potassium hydroxide in water. The concentration of the inorganic compound in these solutions is not restricted as long as they are free from deposition by prolonged application of electric current but is set to the range of 5 to 50%, preferably 10 to 40%. Since the aqueous alkali solutions if leaked from the anode section for some reason is very harmful to the human body, they are preferably thickened or gelled by adding a thickening or gelling substance to be reduced in flowability.

Although not restricted, specific examples of the thickening or gelling substance are sodium alginate, sodium polyacrylate, carboxymethyl cellulose, starch, Poval, agar, polyethylene glycol and poly (vinyl pyrrolidone). The thickening or gelling substance may be used after being modified to cross-linked type polymers by treating with a suitable crosslinker. Although one or more than two of these thickening or gelling substances mixed in a suitable ratio may be added to the solution, the amount of the thickening or gelling substance is not particularly restricted but is within the range of preferably 0.1 to 20 percent, more preferably 0.5 to 10 percent of the electrolyte.

The anode 108 is a counter electrode to have a cathode 109 electrically generate hydrogen peroxide. Although not restricted, the anode 108 is preferably formed from a metal which is free from elusion in an alkaline solution and highly resistant to oxidation reaction because the anode material if eluted is liable to contaminate a diaphragm 110 hereinafter described.

Eligible materials for the anode 108 are metals such as gold, platinum, iridium, ruthenium, nickel and titanium or oxides thereof, all of which are low in overvoltage and hard to wear, compared with other metals or oxides and thus can be used for a long time without being changed. It is also possible to use metallic webs which have a large surface area per unit area. Eligible materials for the metallic web are nickel, stainless steel, iron, copper and alloys thereof.

Although not restricted, the anode 108 is preferably of plate-, mesh- or bar-shaped. In the embodiment shown in FIG. 1, a dimension-stable rectangular electrode is arranged to extend in the perpendicular direction with respect to the apparatus 100.

The anode section 105 may be provided with a means 111 stirring the electrically conductive solution such as an aqueous alkaline solution and a buffer solution charged into the anode section 105. The stirring means 111 may be any type of stirrer. For instance, the stirring means 111 may be comprised of a stirrer and a magnetic stirrer rotating it. Alternatively, as show in drawings, the stirring means 111 may be comprised of a plurality of stirring blades 112 rotatably arranged in the anode section 105 and a motor 113 for rotating the blades connected to an AC source 114. Furthermore, it is also possible to stir the aqueous alkaline solution and the buffer solution by circulating using a pump or by ventilation. Indicated by numeral 115 are vent holes.

The cathode section 106 is further sectioned by a partition 118 into a sterilizing section 116 and an inlet section 117 into which a water-soluble lubricant to be sterilized is introduced. The shapes of the sections 116, 117 may be arbitrary selected. In the illustrated embodiment, the section 116 is in L-shape so as to surround the anode section 105, with a bottom surface located at the same level of the anode section bottom surface. That is, the section 116 forms a rectangular horizontal cross-section, together with the anode section 105. The partitions 107, 118 for the sections 116, 117 and the anode and cathode sections 105, 106 are not restricted in shape or material as long as they can prevent the inflow and outflow of a liquid between theses sections. For example, these section may be separated by partitions formed from an insulating material.

Arranged in the sterilizing section 116 is a cathode 109 located in opposing relation to the anode 108. The cathode 109 is an electrode generating a sterilizing substance, such as hydrogen peroxide and superoxide, sterilizing microorganisms by application of a voltage and thus may be an carbon-based electrode or an electrode supporting one or more organic compounds having an oxidation-reduction capability or supporting a redox resin. The use of these electrodes make it possible to generate hydrogen peroxide even with a voltage of 20 V or less.

No particular limitation is imposed on the carbon-based electrode as long as it can be applied to an on-site hydrogen peroxide production. Eligible carbon-based electrodes are graphite felt, graphite, carbon fiber materials and porous amorphous carbon molded articles. Graphite may be those obtained by extruding calcinated or molded coke. Carbon fiber materials may be knitted carbon fibers. Such knitted carbon fiber materials are exemplified by commercially available CF fabrics. Carbon fiber materials other than CF fabrics is also eligible. Porous amorphous carbon molded articles are exemplified by glassy carbons.

Eligible carbon compound having an oxidation-reduction capability are benzoquinone, naphtoquinone, anthraquinone and derivatives thereof. Specific examples of such derivatives are methoxybenzoquinone, 2tert-butylbenzoquinone, 2,5-diphenylb enzoquinone, 2,6-dimethylbenquinone, 2,6-di-tert-butylbenzoquinone, 2-methylanthraquinone, 2-ethylanthraquinone, 2tert-butylanthraquinone, 1-nitroanthraquinone, 1-or 2-chloroanthraquinone and 1,5- or 1,4- or 1,8-dichloroanthraquinone.

Eligible redox resins are quinone-based redox resins and polyanilines.

Eligible quinone-based redox resins to be supported on the electrodes are benzoquinone-based resins such as a hydroquinone-formaldehyde condensation resin (Manecke, Z. Elektrochem., 57, 189 (1953))and a hydroquinone-(diazotizated poly-p-aminoatyrene) condensation resins (Rao et. al. Chem. Ind. (London), 145 (1961))and anthraquinone-based resins such as 2-formylanthraquinone-polyvinylalcohol condensation resin (Izoret et. al., Ann. Chim., 254, 671 (1962)) but are not limited to these resins.

These compounds and resins are dispersed or dissolved in a solvent such as methanol, isopropyl alcohol, acetone and halogen. A supporting base plate is soaked into the solution and lifted up therefrom and then dried by blowing air. Alternatively, the solution is sprayed over the supporting base plate. No particular limitation is imposed on the material of the base plate as long as it is electrically conductive. Eligible materials for the base plates are carbon electrodes such as graphite, CF fabrics and graphite and metal electrodes such as titanium-coated platinum and copper mesh. These supporting base plate may be subjected to surface treatment with a silane- or titanium-based coupling agent to improve the capability of adsorbing the organic compound.

The electrode supporting an electrically conductive polyaniline is prepared by a method in which a supporting base plate is soaked into a commercially available polyaniline dispersed solution such as one manufactured by OREMECON, under the tradename of Dispersion 900132 and lifted up therefrom, followed by air-dry. Alternatively, the electrode may be prepared by spraying the polyaniline dispersed solution to a base plate. No particular limitation is imposed on the material of the base plate as long as it is electrically conductive. Eligible materials for the base plates are carbon electrodes such as graphite, CF fabrics and graphite and metal electrodes such as titanium-coated platinum and copper mesh. These supporting base plate may be subjected to surface treatment with a silane- or titanium-based coupling agent to improve the capability of adsorbing the organic compound. An electrolytic polymerization as described in "Zairyo Gijyutu" (Material Technology), Vol. 15, No. 5, p 165 (1977).

The cathode 109 generates a sterilizing substance such as hydrogen peroxide and superoxide. Larger surface of the cathode is preferred because it can increase the amount of hydrogen peroxide to be generated. Too small area of the diaphragm 110 results in an extremely reduced electric currents while too large surface results in deteriorated durability of the apparatus. Therefore, the area ratio of the diaphragm 110 to the cathode 109 is within the range of preferably 1/10 to 20/10, particularly preferably 5/10 to 10/10. No particular limitation is imposed on the area ratio of the anode 108 to the cathode 109 as long as the electric current value is not extremely reduced. In the illustrated embodiment, the cathode 109 is formed in the same size of the anode 108 and arranged in the longitudinal portion 116a of the L-shaped sterilizing section 116 to extend in the perpendicular direction of the apparatus 100.

A supporting member may be provided on the surface of the diaphragm 110 facing the sterilizing section 116 to reinforce the diaphragm 110 if having a large area.

The cathode and anode 109, 108 are connected to a source of direct voltage supplied from an electric control circuit 119. The voltage of the source is not particularly restricted as long as it does not adversely affect on the properties of a water-soluble lubricant and thus may be 20 V or less and is particularly preferably 10 V or less. Although the voltage may be supplied to the anode 108 and the cathode 109 continuously or intermittently, the continuous supply is preferred so as to prevent organic matters from adsorbing over the surface of the electrodes.

The electric controlling circuit 119 is provided with a polarity-reversing circuit for supplying temporarily a reversed electric current. More specifically, the polarity-reversing circuit is provided to reverse the direction of the current flow between the anode 108 and the cathode 109 automatically at the same interval for a certain period time. Although the period of time for reversing the current flow direction is not particularly restricted, too long period not only reduce the amount of hydrogen peroxide to be generated but also decompose increasingly the amount the hydrogen peroxide which has been already generated, while too short period fails to remove the contaminants deposited on the surface of the cathode 109, leading to a short life time of the apparatus. Therefore, the total reversing period of time is preferably 30 seconds or longer and 10 hours or less per 24 hours and more preferably 1 minute or longer and 6 hours or less per 24 hours. The polarity reversing operation may be conducted several times in 24 hours. For example, the operation may be repeated for 10 minutes every 4 hours. Such reversing operation can remove contaminants formed over the surfaces of the electrodes (anode 108 and cathode 109) and the diaphragm 110. The operation can also prevent the electric current from being reduced. Furthermore, the effect of the polarity-reversing operation is to eliminate additives (a cationic long-chain alkyl compound) of a water-soluble lubricant or micell containing the additives, adsorbing over the surface of the cathode 109 and to prevent the formation of molds over the surfaces of the electrodes. When a putrefied liquid is introduced into the inventive apparatus, the polarity-reversing operation is particularly effective because molds and slime are adhered to the electrode surfaces until the colony forming unit in the tank of a machining apparatus is decreased.

A part of the partition 107 located between the anode 108 and the cathode 109 is formed by a diaphragm 110 such that an electric current flows therebetween.

Although not restricted, the material of the diaphragm 110 is preferably an electrically insulating porous film such as those using polychlorinated ethylene, polyvinylidene fluoride (PVDF), polytetrafluoroethylene (PTFE), polyethylene, poval or cellulose, as a base material. These base material may be copolymerized in a suitable weight ratio. Alternatively, the base material may be put in use after being chemically modified with additives.

The cathode 109 is located in front of the anode 108 and the space therebetween is not particularly restricted but is preferably within the range of 0 to 50 cm, more preferably 0 to 20 cm.

Arranged in the portion 116b extending transversely in FIG. 1 of the sterilizing section 116 is an inlet regulator 121 constituting a main part of a separator 120 which prevent impurities (machine oils such as a sliding surface oil, a bearing oil and a gear oil, accompanied from the machining apparatus) contained in the water-soluble lubricant from flowing into the sterilizing section 116. The inlet regulator 121 comprises a inlet tube 122 extending perpendicularly through the bottom surface of the sterilizing section 116, with a bottom opening 122a in the inlet section 117 and an outlet regulating means 123 arranged on the upper portion of the tube 122 movably along the longitudinal direction thereof so as to outflow a liquid rising through the inlet tube 122 into the sterilizing section 116. A suitable adjustment of the position of the outlet regulating means 123 along the tube 122 can select a suitable position for outflowing the liquid into the sterilizing section 116.

Alternatively, a stirring means may be provided in the sterilizing section 116 in order to stir the water-soluble lubricant entering thereinto. In this case, needless to mention, the upper surface of the sterilizing section 116 opens to the air. The stirring means may be one composed of a plurality of stirring blades and a motor rotating them. The stirring means may be a magnet stirrer system, a pump-circulation system or a ventilation-stirring system.

Provided in one side of the container 101 is an inlet port 124 connected to a liquid supply pump 103 shown in FIG. 9, through which inlet port 124 a water-soluble lubricant is introduced into the inlet section 117. The inlet 124 may be provided with an intermittent supplying means such that a water-soluble lubricant is intermittently introduced into the inlet section 117 at certain intervals for a certain period of time.

Provided in the opposite side of the container 101 is a discharging port 125 for overflowing the upper portion of the liquid stored in the inlet section 117 with the impurities. The sterilizing section 116 is provided with a discharging port 126 through which the sterilized liquid overflows. The discharging port 126 is arranged at a position where the cathode 109 is sufficiently immersed in the water-soluble liquid entering into the sterilizing section 116. The port 125 is arranged in a suitable position which is higher in the perpendicular direction than the port 126.

The anode section 105 may be in a replaceable cartridge-type box shape. Similarly, the sterilizing section 106 may also be in this type of box shape. No particular limitation is imposed on the shape of the sections as long as they are in box-shape. Such exchangeable cartridge boxes make it easy to exchange these sections.

Figure 2:
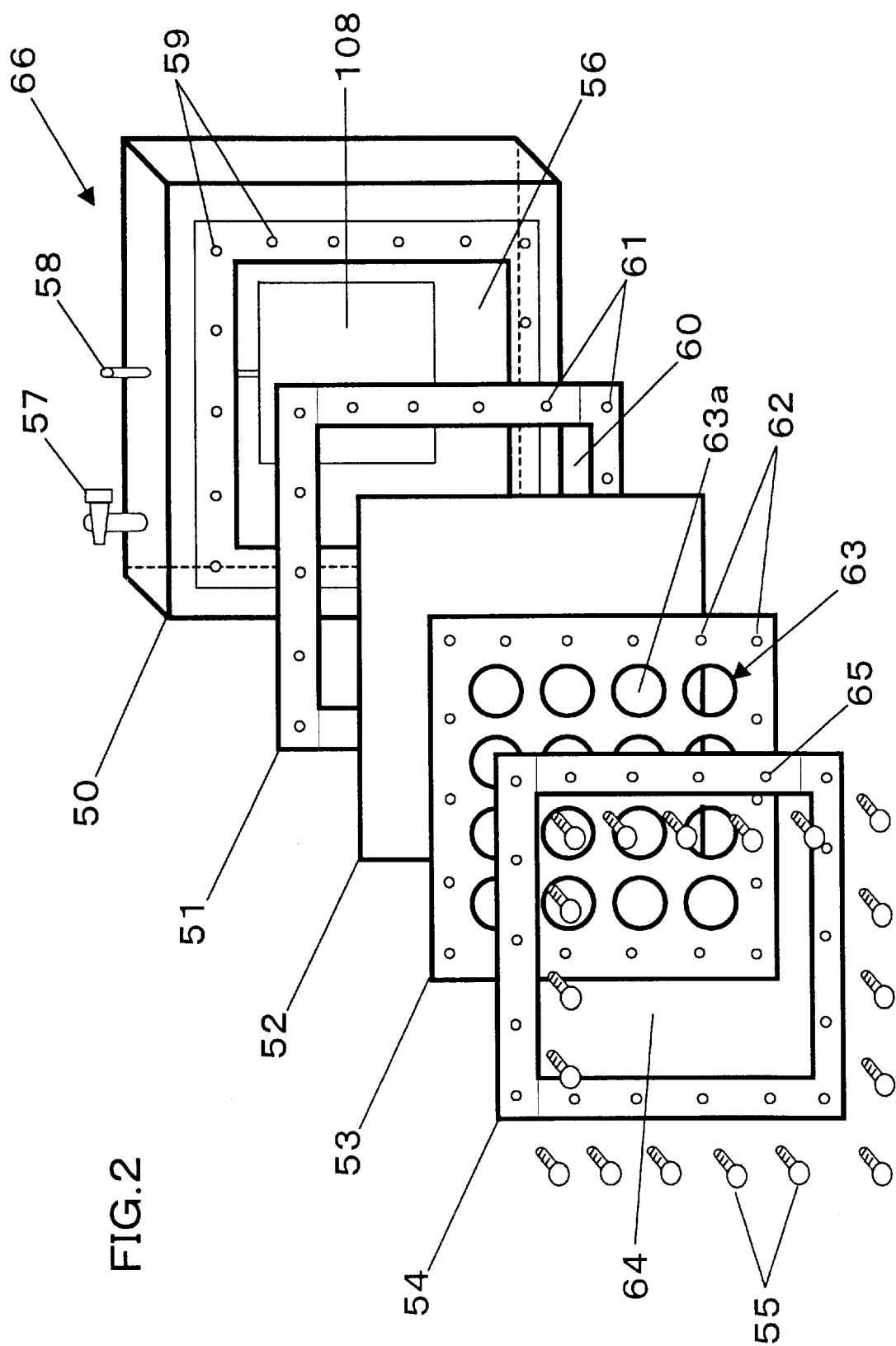
FIG. 2 shows an anode box used in the present invention.

More specifically, as shown in FIG. 2, an anode box 66 is composed of a main body 50, a packing 51, a diaphragm 52, a supporting plate 53, a frame and a plurality of screws 55.

The main body 50 is shaped like a box and has in one side thereof a rectangular opening 56. Furthermore, the main body is provided on its upper portion a switchable cock 57 which is maintained opened during application of voltage such that a gas (oxygen gas) in the main body 50 leaks and maintained closed when feeding the electrically conductive material through the opening 56. Inside of the main body 50, an electrode (anode 108) in a plate-shape is detachably mounted and connected to a connection terminal 58 protruding on the upper portion of the main body 50.

Provided around the opening 56 are a plurality of threaded holes engaging with the screws 55.

The packing 51, the diaphragm 52, the supporting plate 53 and the frame 54 has almost the same shape and more specifically are each formed in rectangle which is smaller in size than the front surface of the main body 50 having the opening 56. The packing 51 has an opening 60 in the same shape as the opening 56 and a plurality of threaded holes 61 around the opening 60 in a position corresponding to the threaded holes 59 of the main body 50. The screws are introduced through the threaded holes 61. The supporting plate 53 has a plurality of threaded holes 62 through which the screws are introduced and a plurality of openings 63 in the central portion of the plate. These holes may be in the form of a circle 63a or may be in the form of a square 63b or a rectangle 63c as shown in FIGS. 3a and 3b.

The frame 54 is in the almost same shape as the packing 51 and thus has in its center an opening 64 and a plurality of threaded holes corresponding to those of the packing 51. The frame 54 is preferably made of metal so as to prevent a liquid from leaking. The material of the main body 50 and the supporting plate 53 is preferably an insulating resin. A metal is also eligible if the portion of the main body 50 to be contacted with the connection terminal 58 is protected with an insulating material.

The anode 18 is mounted in the main body 50 and then the electrically conductive material is introduced thereinto. After this, the packing 51 is stacked on the surface of the main 50 to align the threaded holes 61 with the threaded holes 59 of the main body 50 and then the diaphragm 52 is stacked on the packing 51. Furthermore, the supporting plate 53 and the frame 54 are stacked on the diaphragm 52 one after another. These members are fixed to the main body 50 with the screws 55, thereby forming the anode box 66 which is free from leakage of the electrically conductive material.

Figure 4:
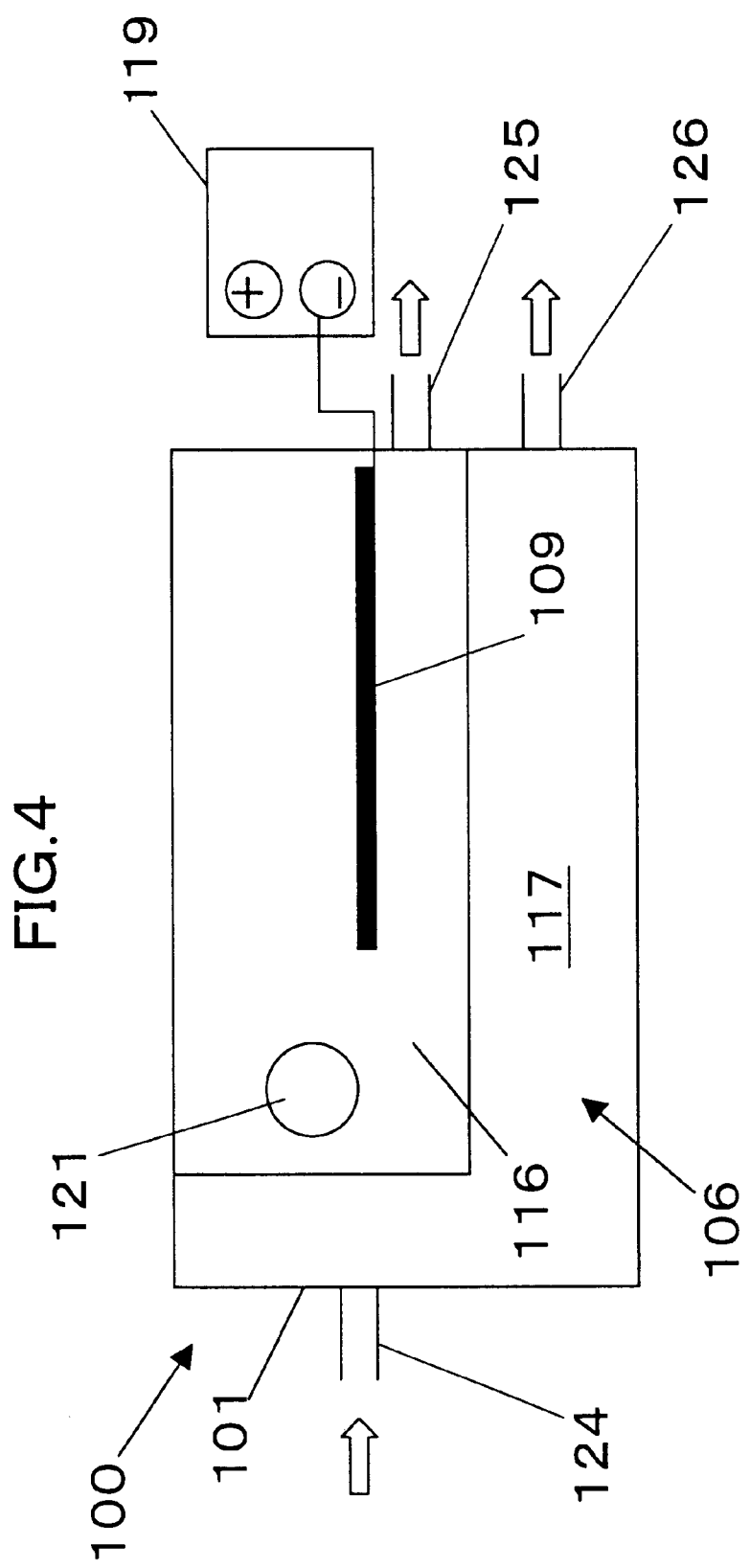
FIG. 4 shows a sterilizing apparatus from which the anode box is removed from the apparatus shown in FIGS. 1a and 1b.

When using the cartridge type anode box 66, the apparatus 100 shown in FIG. 1 is formed by arranging the anode box 66 in a position in the container 101 as shown in FIG. 4.

No particular limitation is imposed on a means for fixing the diaphragm 52 to the main body 50 of the anode box 66 as long as it can avoid a liquid from leaking. Therefore, the diaphragm may be fixed to the main body 50 by means of screws. If the cartridge type anode box 66 is preserved in a gas phase, it is preferred to cover the surface of the diaphragm 52 or the supporting plate 53 with a protective film so as to prevent the alkali from exuding through the diaphragm 52 and protect the anode box from being physically damaged.

It is also possible to employ structures of the anode box other than as shown in FIG. 2, for example the structures shown in FIGS. 8a through 8c. FIGS. 8a through 8c are cross-sectional views of different structures of the anode box. FIG. 8a shows an anode box 501 having on one side a single diaphragm for a single anode 108. The anode box in FIG. 8a is applicable to the apparatus 100 shown in FIG. 1. The electrically conductive material in the anode section 500 is stirred by means of stirring blades 502 arranged on the bottom surface of the box 501 and having a gear 503. When the anode box 501 is installed in the sterilizing section, the gear 503 is brought into mesh with a gear provided on the tip of a stirring rod protruding from a stirring motor arranged on the bottom of the sterilizing section. An anode box which is devoid of the stirring blade 502 shown in FIG. 8a is applicable to an apparatus shown in FIG. 6. FIG. 8b shows an anode box having on the both sides two diaphragms for a single anode 108, which box is applicable to an apparatus shown in FIG. 7. FIG. 8c shows an anode box having two anodes 108, 108 separated from each other by an insulating plate 504 extending in the longitudinal center of the box. One diaphragm is provided for each of the anode. Although the anode box shown in FIG. 8c is more complicated in structure than that shown in FIG. 8b, the anode box in FIG. 8c can supply a voltage more effectively. In FIG. 8a through 8c, numerals 505, 506, 507 and 508 indicate a screw, a frame, a supporting plate and a packing, respectively.

The following will describe how a water-soluble lubricant is sterilized using an apparatus 100.

First of all, in the case where an electrically conductive material contained in the anode section 105 is an electrically conductive solution, it is stirred by rotation of stirring blades 112 at the same time when a water-soluble lubricant is introduced through the inlet port 124 into the inlet section 117 of the container 102. The lubricant is stored in the inlet section 117 and then introduced through the opening 122a of the tube 122 by the inlet regulator 121. Simultaneously with this, a part of the upper portion of the lubricant in the inlet section 117 overflows the container 101 through the discharging port 126, together with the above-described impurities.

A water-soluble lubricant is prone to be mixed with the above-described impurities comprised of a machining apparatus, such as a machine oil including a sliding surface oil, a bearing oil and a gear oil. These impurities, if flowing into the sterilizing section 116, adhere to the electrode (cathode 109) and the diaphragm 110, causing disadvantages that the formation of hydrogen peroxide is hindered. However, the apparatus according to the present invention is free form such disadvantages because the impurities are discharged through the discharging port 126 from the container 101.

More specifically, since the impurities such as machining oils are small in specific gravity than a water-soluble lubricant, the impurities flowing into the container 101 are separated from the lubricant and float thereover. Since the floating impurities are discharged through the discharging 126 port from the container 101, so they do not flow into the sterilizing section 116.

The sterilizing section 116 into which the lubricant flows is provided with the cathode 109. A voltage is applied to the cathode 109 and the anode 108 and then a sterilizing substance, such as hydrogen peroxide are generated from the cathode 109. The substance can sterilize the lubricant and suppress the proliferation of microorganisms. The sterilized lubricant overflows the container 101 through the discharging port 125.

As shown in FIG. 1a, the cathode 109 and the anode 108 are separated from each other by the diaphragm 110. Even if protons are formed from the anode 108, the lubricant is free from the reduction of pH because the protons are prohibited from flowing into the sterilizing section 116. As a result of this, the apparatus according to the present invention can prevent not only the lubricant from deteriorating the rust preventing properties and lubricity but also the microorganisms from proliferating. Furthermore, since the sterilizing substance generated from the cathode 109 does not encounter the decomposition by the anode 108, the stable sterilization of a lubricant can be achieved. In the case where an electrically conductive material in the anode section 105 is an electrically conductive solution, the protons generated form the anode 108 can be effectively neutralized by stirring the solution.

Therefore, the present invention is economically advantageous because the cathode generating the sterilizing substance are separated from the anode 108 by the diaphragm 110 so as to prevent the protons generated from the anode 108 from being mixed with the lubricant, resulting in a stable sterilization being achieved without adversely affecting the properties of a lubricant.

Furthermore, the water-soluble lubricant flowing into the sterilizing section 116 passes through the section 116a, i.e. in front of the surface of the cathode 109 toward the discharging port 125. This flow of the lubricant ensures that it is sterilized by the sterilizing substance generated from the cathode 109.

A belt-type or pump-type skimming device may be arranged at the portion extending in the upper stream from the inlet 124 so as to separate a lubricant from machining oils more effectively.

The electrically conductive material in the anode section 105 needs to be replaced with a fresh one at regular intervals because of the current value reduction involved with neutralization of the alkali contained in the electrically conductive material by the protons generated when applying a voltage. The replacement of the electrically conductive material can be easier and more effective if using the above-described type anode box shown in FIG. 2.

The cartridge-type anode box has a detachable diaphragm which is thus easily replaced with a new one and the electrically conductive material can be easily replaced through the space where the diaphragm left.

In the above-described embodiment of the present invention, the container 101 is structured so as to introduce a water-soluble lubricant into the sterilizing section 116 through the opening 122a situated in proximity of the bottom of the container, thereby avoiding the same lubricant from remaining in the container 101 and is divided into two sections 105, 106 so as to separate impurities from the lubricant utilizing the difference in specific gravity therebetween, thereby avoiding the impurities comprised of machining oils such as a sliding surface oil, a bearing oil and a gear oil from adhering to the diaphragm and the electrode. However, needless to mention, if a water-soluble lubricant is free of such impurities, it is not necessary to divide the container into two sections.

As shown in FIG. 9, the container of the inventive apparatus is provided separately from the storage tank. However, if the storage tank can be used as the container for sterilization, the storage tank may be formed into a sterilizing apparatus according to the present invention.

Figure 5A:
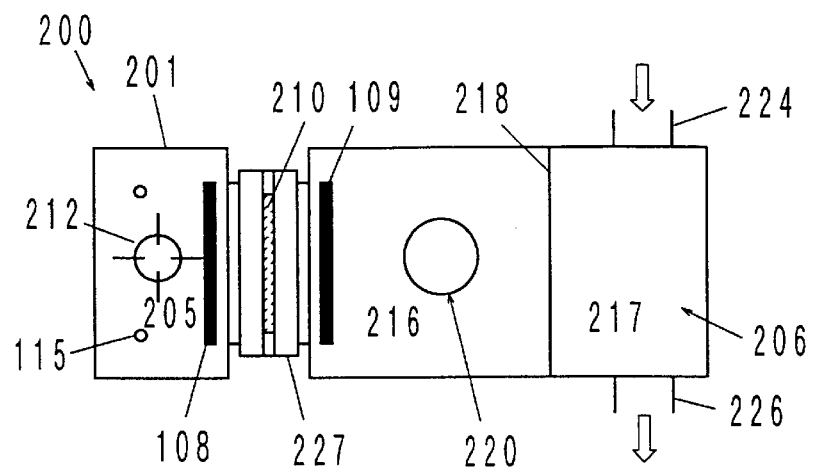
FIGS. 5a and 5b show a sterilizing apparatus of a second embodiment of the present invention and are a top view and a cross-sectional view, respectively.
Figure 5B:
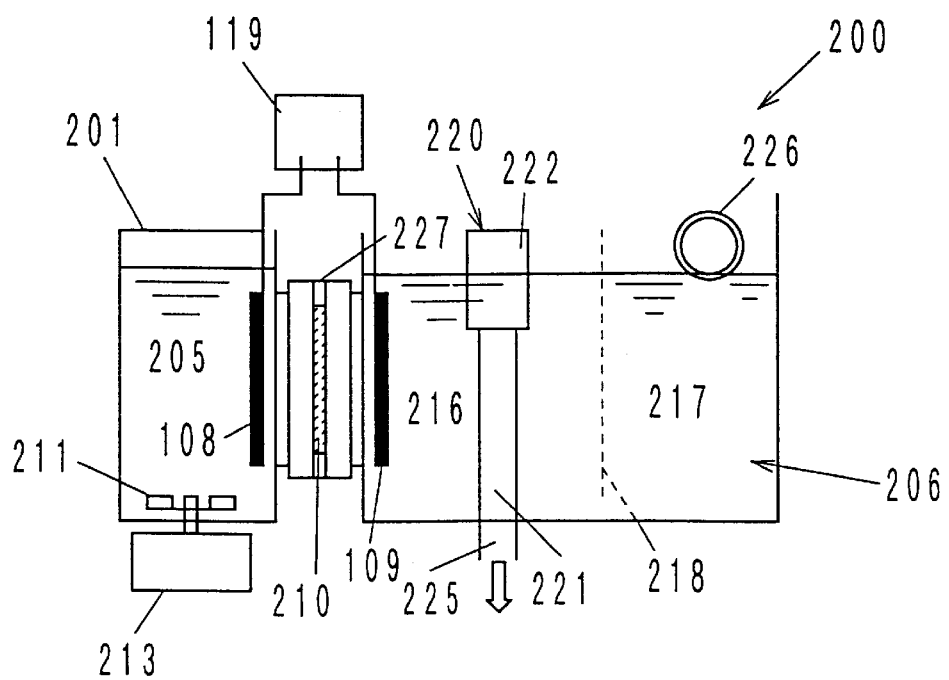

FIGS. 5a and 5b show a second embodiment of the present invention. An apparatus indicated by numeral 200 has a H-shaped container 201. The parts and members which are the same as those of the apparatus 100 are indicated by the same numerals.

The container 201 is divided into two sections in H shape. Indicated by numeral 205 is an anode section provided with an anode 108, while indicated by numeral 206 is a cathode section. These sections are communicated with each other through a portion 227 provided with a diaphragm 210. The anode section 205 is provided with the anode 108 in proximity of the communicating portion 227 and charged with an electrically conductive solution. Provided in the bottom of the anode section 205 in FIG. 5b are stirring blades 211 which are rotatably driven by a motor 213.

The cathode section 206 is perpendicularly divided into a sterilizing section 216 and an inlet section 217. The partition 218 is placed, spaced apart from the bottom of the cathode section 206 such that a lubricant is allowed to flow freely between these sections 216,217. The container 201 has a inlet port 224 and a discharging port 226 in the inlet section 217. The inlet port 224 may be provided with a means feeding a water-soluble lubricant intermittently at a certain interval for a certain period of time.

The sterilizing section 216 is provided with the cathode 109 arranged so as to be in the proximity of the communication portion 227 and face the anode 108. A diaphragm 210 is arranged between the cathode 109 and the anode 108. Furthermore, the sterilizing section 216 is provided in the center with a liquid surface regulator 220 composed of a discharging tube 221 perpendicularly extending through the bottom of the sterilizing section 216 and having a bottom end opening forming an outlet port 225 for discharging a sterilized liquid and a liquid surface regulating means 222 arranged on the upper portion of the tube 221 so as to be movable along the longitudinal direction thereof and guiding the liquid introduced in the sterilizing section 216 into the discharging tube 221. A suitable adjustment of the regulating means 222 with respect to the longitudinal direction of the tube 221 makes it possible to adjust the level of the surface of the liquid in the sterilizing section 216.

The apparatus 200 having the structure as described can achieve the same effects and functions as obtained by the apparatus 100 shown in FIG. 1.

When the electrically conductive material to be introduced into the anode section 205 is an electrically conductive solution, it is stirred by rotation of the stirring blades 211 as clearly shown in FIGS. 5a and 5b. Simultaneously with this, a voltage is applied to the anode 108 and the cathode 109 while a water-soluble lubricant is being introduced into the inlet section 217 through the inlet port 224. The lubricant introduced into the inlet section 217 then passes through the space defined between the bottom of the partition 218 and the bottom surface of the cathode section 206 and flows up to a certain level in the sterilizing section 216. On the other hand, the impurities remaining in the upper portion of the lubricant in the inlet section 217 overflow the container 201 through the discharging port 226.

As a result of this, it is made possible to avoid the impurities contained in the lubricant from flowing into the sterilizing section 216 and from adhering to the cathode 109 and the diaphragm 210. Defectives, such as hindrance of the generation of hydrogen peroxide, can be avoided.

The lubricant rising up in the sterilizing section 216 is sterilized by a sterilizing substance generated from the cathode 109 and then flows into the liquid surface regulating means 222 so as to be discharged from the discharging port 225 of the tube 221.

In this apparatus 200, a water-soluble lubricant is free from a reduction in pH because protons, even if formed from the anode 108, do not flowing into the sterilizing section 216 due to the provision of the diaphragm 210 separating the cathode 109 from the anode 108. Consequently, a water-soluble lubricant can be avoided from being deteriorated in its rust preventing properties and lubricity and can be free from the proliferation of microorganisms. Furthermore, a stable sterilization of a lubricant can be achieved because the sterilizing substance is not decomposed by the anode 108.

Therefore, the second example of the apparatus 200 according to the present invention can perform a stable sterilization of a lubricant without adversely affect the properties thereof by the sterilizing substance generated from the cathode 109 which is separated from the anode 108 generating protons by the diaphragm 210.

Figure 6A:
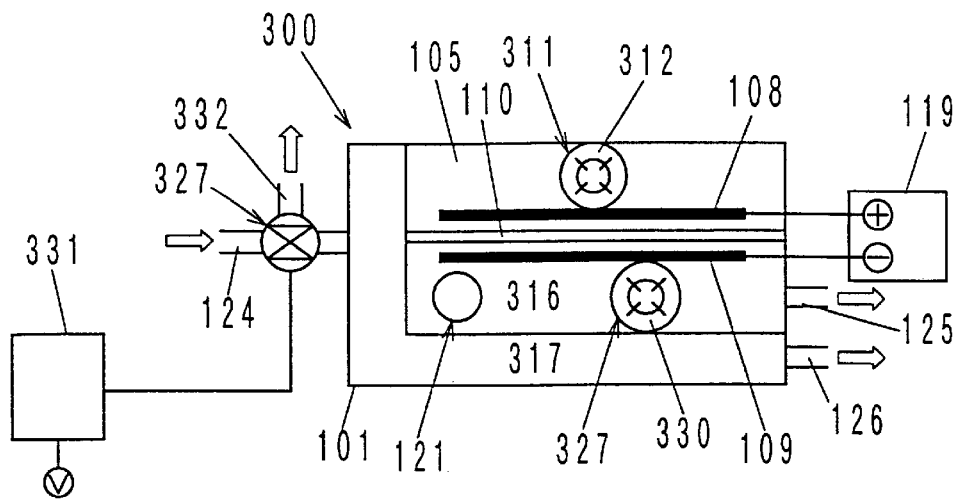
FIGS. 6a and 6b show a sterilizing apparatus of a third embodiment of the present invention and are a top view and a cross-sectional view, respectively.
Figure 6B:
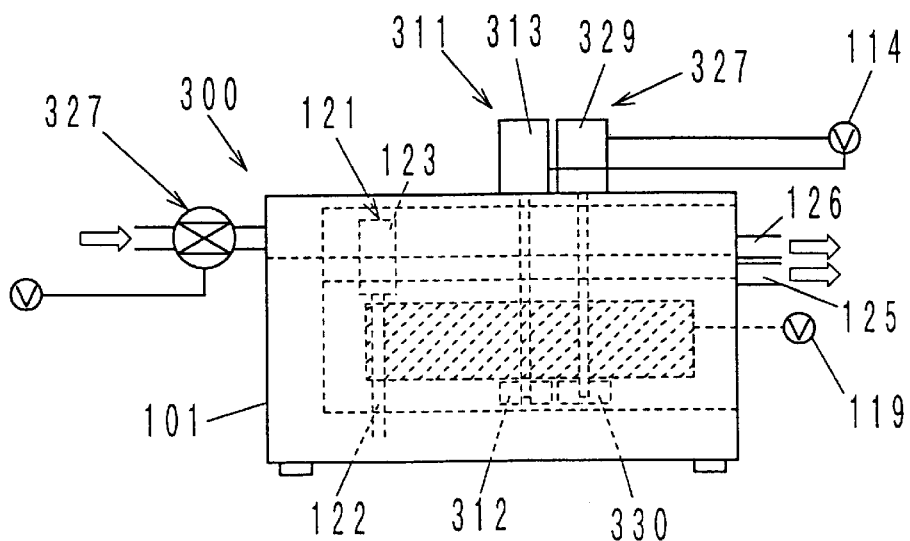

FIGS. 6a and 6b show a third example of the inventive apparatus which is different from the first example in the shape of the sterilizing section and in the provision of a switching means 327. The same parts or members as those of the apparatus of the first example are indicated by the same numerals and thus the explanation of these parts or members are omitted for brevity.

In the case where a buffer solution and an electrically conductive solution such as an aqueous alkali solution are charged into the anode section 105, the apparatus 300 may be provided with a stirring means 311 as shown in FIG. 6a. In this case, the upper portion of the anode section 105 opens to the air. The stirring means 311 may be comprised of stirring blades 312 and a motor 313 rotating them but are not limited to this type. It is also possible to employ a stirring means of a magnetic stirrer type, a pump-circulation type or an aeration-stirring type. The anode section 105 may be the above-described replaceable cartridge type anode box.

A sterilizing section 316 is almost in the same shape as the anode section 105 in the horizontal direction and arranged adjacent one side of the anode section 105. In the sterilizing section 316, the cathode 109 is arranged so as to be in opposed relation to the anode 108 and separated therefrom by the diaphragm 110. The sterilizing section 316 is provided with a stirring means 327 for stirring the water-soluble lubricant, thereby avoiding the reduction of electric current value. In this case, needless to mention, the upper portion of the sterilizing section 316 opens to the air. The stirring means 327 may be comprised of stirring blades 330 and a motor 329 rotating them but are not limited to this type. It is also possible to employ a stirring means of a magnetic stirrer type, a pump-circulation type or an aeration-stirring type. The sterilizing section 316 may be in the shape of a replaceable cartridge type box.

Arranged in the middle of an inlet port 124 extending from one side of the container 101 is a channel switching means 327 such as a three-way electromagnetic valve provided with a timer 331. The channel switching means 331 usually functions to return a water-soluble lubricant to the storage tank 102 through the outlet port 332. The channel switching means 327 can switch the flow direction of the lubricant at a certain interval for a certain period of time so as to introduce the lubricant to the inlet section 317 of the container 101 via the timer 331. In the case where the lubricant is introduced through the inlet section 317 to the sterilizing section 316 intermittently, the above-described polarity reversing is preferably effected while the lubricant is circulating in the sterilizing section 316 because a long period of polarity reversing, if effected when a high concentration of hydrogen peroxide is stored in the sterilizing section 316, may cause decomposition of a great volume of hydrogen peroxide. The polarity reversing may be initiated simultaneously with the circulation of the lubricant in the sterilizing section 316 but preferably after the circulation is initiated and then the hydrogen peroxide in the sterilizing section 316 becomes equal in concentration as that of the lubricant in the storage tank 102.

The apparatus 300 having the above-described structure can achieve the same functions and effects as the apparatus 100 shown in FIG.1 does.

More specifically, the water-soluble lubricant is introduced from the inlet port 124 via the switching means 327 into the inlet section 317 of the container 101. After a certain interval, the flow direction of the lubricant altered by the switching means 327 so that the lubricant is discharged through the discharging port 332. The lubricant flowing into the inlet section 317 then rises up through the tube 122 and flows into the sterilizing section 316 to be stored therein, through the regulating means 123. On the other hand, even if the lubricant is accompanied with impurities comprised of machining oils such as a sliding surface oil, a bearing oil and a gear oil, brought from the machining apparatus, the sterilizing section 316 is free from contamination caused by such impurities because the upper portion of the lubricant in the inlet section 317 is discharged from the container 101 through the discharging port 126.

As described above, the prevention of the sterilizing section 316 from being contaminated with the impurities makes it possible to eliminate a malfunction that the generation of hydrogen peroxide is caused by adhesion of the impurities to the electrode (cathode 109) and the diaphragm 110.

The water-soluble lubricant in the sterilizing section 316 is stirred by rotation of the stirring blades 330, while the electrically conductive material in the anode section 105 is stirred by rotation of the stirring blades 312. The water-soluble lubricant is sterilized by the sterilizing substance generated from the cathode 109 by applying a voltage to the cathode and the anode. After completion of such sterilization, the flow direction of the water-soluble lubricant through the inlet port 124 is changed by the switching means 327 so as to be introduced into the inlet section 317 again, resulting in the sterilized lubricant in the sterilizing section 316 being discharged through the discharging port 125.

The third apparatus 300 of the present invention can perform a stable sterilization leading to economical advantages without adversely affecting the properties of a water-soluble lubricant because it is sterilized by the sterilizing substance generated from the cathode 109 which is separated from the anode 108 by the diaphragm 110 so as to prevent the protons generated from the anode 108 from being mixed with the lubricant.

A continuous introduction of a water-soluble lubricant into the sterilizing section 316 would fail to store the sterilizing substance in more than certain concentration, resulting in continuance of insufficient sterilization. In this situation, microorganisms and molds are proliferated over the electrode during the operation, resulting in an extreme reduction in efficiency of generating the sterilizing substance. However, since in the third apparatus of the present invention, a water-soluble lubricant is intermittently introduced to the inlet section 317, as described above, a high concentration of the sterilizing substance is stored in the sterilizing section 316. Furthermore, the third apparatus 300 has a function of cleaning the sterilizing section 316 since the section 316 is kept in a complete germ free state until the sterilized lubricant flows out from the container 101 after the flow direction of the lubricant in the inlet port 124 is changed.

Figure 7A:
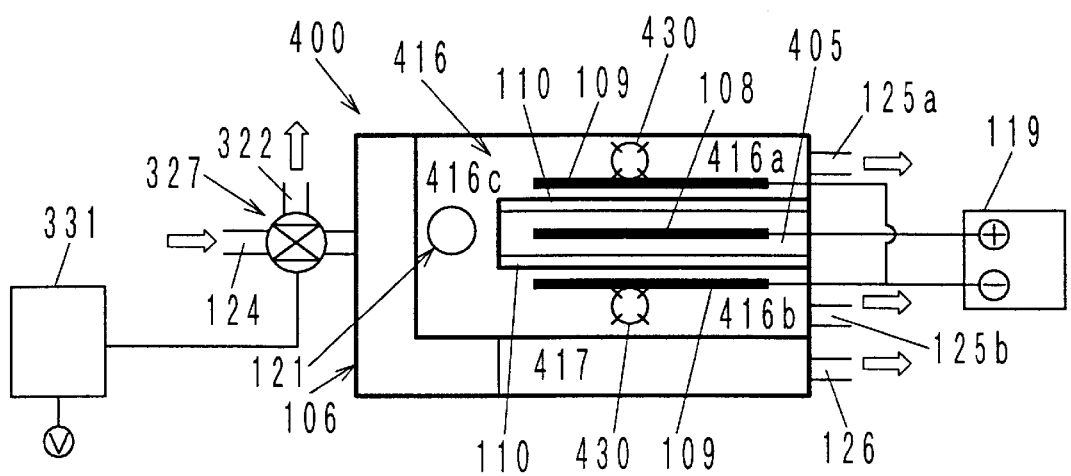
FIGS. 7a and 7b show a sterilizing apparatus of a fourth embodiment of the present invention and are each a top view and a cross-sectional view, respectively.
Figure 7B:
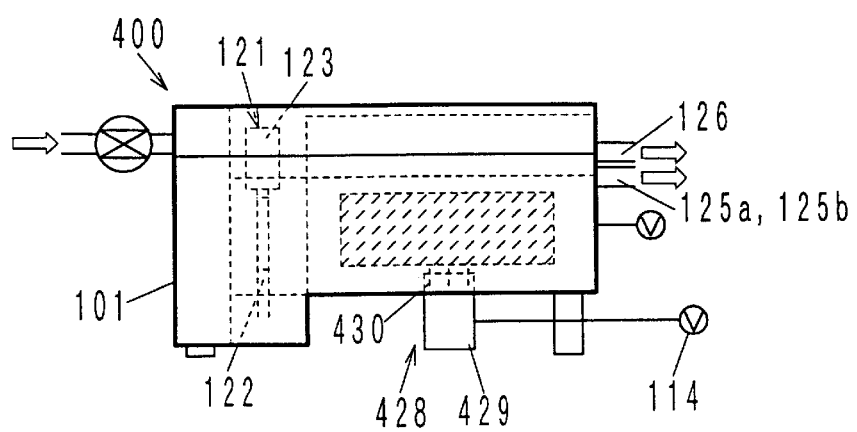

FIGS. 7a and 7b shows a fourth apparatus of the present invention which is different from that shown in FIG. 1a in that the former is provided with two cathodes for a single anode and a switching means 327. The same parts or members as those of the apparatus of the previously described examples are indicated by the same numerals in FIGS. 7a and 7b and thus the explanation of these parts or members are omitted for brevity. The switching means is the same as that of the third apparatus and affixed to the same numeral.

An anode section 405 has a rectangular horizontal cross section and is provided with an anode 108 extending in the longitudinal direction thereof. Provided on the sides extending longitudinally extending in sandwich relation to the anode 108, of the anode section 405 are diaphragm 110, 110 arranged in parallel relation to each other. Two cathodes 109, 109 are each arranged in the proximity of the two diaphragms 110, 110. The anode 108, and the diaphragms 110, 110 and the cathodes 109,109 are in the same shape and size. The anode section 405 may be a replaceable cartridge-type anode box as described above. In this case, the anode box is provided on both sides with diaphragms 110. More specifically, the members described with reference to FIGS. 2 and 3 are symmetrically arranged.

A sterilizing section 416 has a concave horizontal cross section. The anode section 405 is arranged between two extruding side portions 416a and 416b of the section 416 and forms a rectangular horizontal cross section together with the sterilizing section 416. Each of the side portions 416a and 416b is provided with the cathode 109 so as to be opposing relation to the anode 108. An electric current is passed between the anode 108 and the cathodes 109, 109.

The side portions 416a, 416b are each provided with discharging ports 125a, 125b for discharging the sterilized lubricant, extending from their end surfaces and with a stirring means 428. The stirring means 428 may be comprised of stirring blades 430 and a motor 429 rotating them but are not limited to this type. It is also possible to employ a stirring means of a magnetic stirrer type, a pump-circulation type or an aeration-stirring type. The central portion 416c connecting the two side portions 416a, 416b is provided with an inlet regulator 121. The sterilizing section 416 may be in the shape of a replaceable cartridge type box.

No particular limitation is imposed on the shape of an inlet section 417 as long as it is shaped such that its bottom portion where the inlet regulator 121 is arranged is situated at the predetermined level lower than the bottom surface of the sterilizing section 416. The rest of the bottom portion where for instance the electrodes 108, 109 are located may be at the same level as that of the sterilizing section 416 as shown in FIG. 7b. That is, the bottom of the container 101 may be provided with a step.

The apparatus 400 having the above-described structure can achieve the same functions and effects as the apparatus shown in FIG.1 does.

More specifically, the water-soluble lubricant is introduced from the inlet port 124 via the switching means 327 into the inlet section 417 of the container 101. After a certain interval, the flow direction of the lubricant altered by the switching means 327 so that the lubricant is discharged through the discharging port 322. The lubricant flows into the inlet section 417 and the portion close thereto then rises up through the tube 122 and flows into the sterilizing section 416 to be stored therein, through the regulating means 123. On the other hand, even if the lubricant is accompanied with impurities comprised of machining oils such as a sliding surface oil, a bearing oil and a gear oil, brought from the machining apparatus, the sterilizing section 416 is free from contamination caused by such impurities because the upper portion of the lubricant in the inlet section 417 is discharged from the container 101 through the discharging port 126.

As described above, the prevention of the sterilizing section 416 from being contaminated with the impurities makes it possible to eliminate a defective that hindrance of the generation of hydrogen peroxide is caused by adhesion of the impurities to the electrode (cathodes 109, 109) and the diaphragms 110, 110.

The water-soluble lubricant in the sterilizing section 416 is stirred by rotation of the stirring blades 430 by a motor 429. The water-soluble lubricant is sterilized by the sterilizing substance generated from the cathodes 109, 109 by applying a voltage to the cathodes 109, 109 and the anode 108. After completion of such sterilization, the flow direction of the water-soluble lubricant through the inlet port 124 is changed by the switching means 327 so as to be introduced into the inlet section 417 again, resulting in the sterilized lubricant in the sterilizing section 416 being discharged through the discharging ports 125a, 125b.

The fourth apparatus 400 of the present invention can perform a stable sterilization leading to economical advantages without adversely affecting the properties of a water-soluble lubricant because it is sterilized by the sterilizing substance generated from the cathodes 109, 109 which is separated from the anode 108 by the diaphragms 110, 110 so as to prevent the protons generated from the anode 108 from being mixed with the lubricant.

A continuous introduction of a water-soluble lubricant into the sterilizing section 416 would fail to store the sterilizing substance in more than certain concentration, resulting in continuance of insufficient sterilization. In this situation, microorganisms and molds are proliferated over the electrode during the operation, resulting in an extreme reduction in efficiency of generating the sterilizing substance. However, since in the fourth apparatus 400 of the present invention, a water-soluble lubricant is intermittently introduced to the inlet section 417, as described above, a high concentration of the sterilizing substance is stored in the sterilizing section 416. Furthermore, the fourth apparatus 400 has a function of cleaning the sterilizing section 416 since the section 416 is kept in a complete germ free state until the sterilized lubricant flows out from the container 101 after the flow direction of the lubricant in the inlet port 124 is changed.

Furthermore, the apparatus can be downsized since the sterilizing section 416 has the two diaphragms 110, 110, one anode 108 located in the center therebetween and the two cathodes 109, 109 arranged in sandwich relation to the diaphragms 110, 110 and the anode 108, and thus can be reduced in size, compared with a sterilizing section having a single cathode for one anode.

The invention will be further described by way of the following examples which are provided for illustrative purposes only.

EXAMPLE 1

The apparatus shown in FIG. 5 was assembled using a titanium-coated platinum plate as an anode, a CF fabric as a cathode and a commercially available product "Durapore® Membrane Filter VVLP 14250" which is poly vinylidene fluoride-based and manufactured by MILLIPORE Co., Ltd. as a diaphragm.

Figure 10:
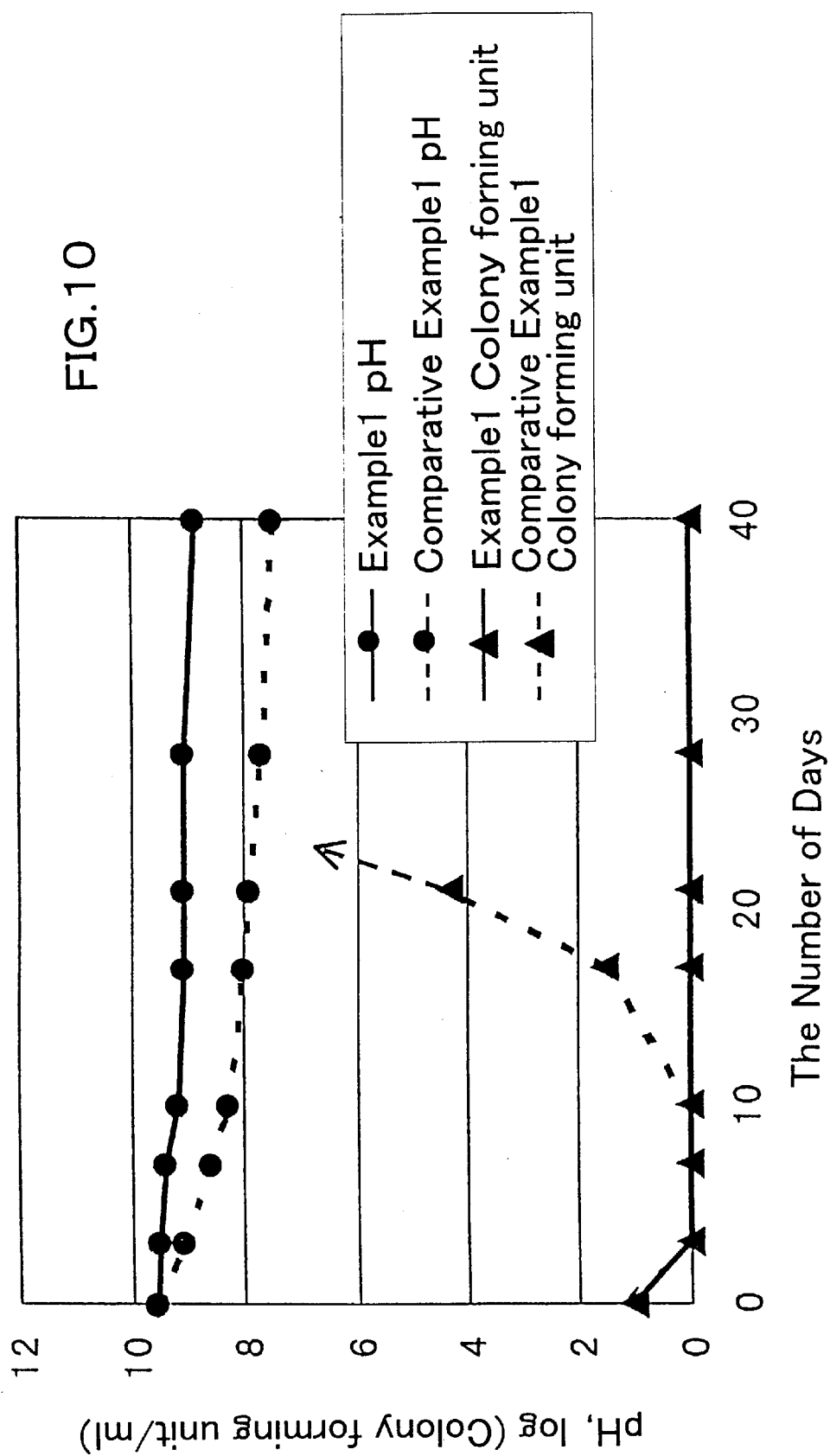
FIG. 10 is a graph showing the relationship between pH, colony forming unit and the number of days.

A buffer solution of 10% sodium dihydrogenphosphate-potassium dihydrogenphosphate (pH 9.0) was charged into the anode section of the apparatus. A water-soluble cutting oil "UNISOLUBLE EM-L" manufactured by Nisseki Mitsubishi Oil Company, diluted 10 times was supplied at a flow rate of 1 L per minute to the apparatus and a voltage of 20 V is continuously applied to the electrodes. The cutting oil was kept at a temperature of 30° C. and 1% of corn flour and of particulated cast iron were added thereto before the application of voltage. Even after one month passed, the reduction of pH and the proliferation of microorganisms was not observed in the cutting oil. The results were shown in FIG. 10. The rust preventing characteristics of the cutting oil treated in this apparatus was evaluated in accordance with "Metal Corrosion Test" 5. 4. 8 prescribed in JIS K2241-1986 "Cutting Oil". No discoloration was observed on all of the metal plates (steel, copper, and aluminum plates).

COMPARATIVE EXAMPLE 1

The anode section was removed form the above obtained apparatus. The flange portion connecting the anode section and the cathode section was blanked off. A CF fabric and a titanium-coated platinum plate were used as an anode and a cathode, respectively and were placed into the cathode section so as to face each other without being contacted to each other. The same cutting oil as that of Example 1 was sterilized under the rest of the conditions being the same as those of Example 1. The cutting oil was extremely reduced in pH and increased in colony forming unit up to more than $10^5$ units/ml after 20 to 30 days passed. The apparatus was apparently insufficient in sterilization performance. The results were also shown in FIG. 10. The same rust preventing characteristics evaluating test as that of Example 1 was conducted. Discoloration was observed on the steel and copper plates, that is, the rust preventing characteristics of the cutting oil were deteriorated.

EXAMPLE 2

Preparation of Electrodes

A CF fabric was dipped into a solution of 5% 2-ethylanthraquinone in acetone for two minutes. The CF fabric was then lifted up slowly and dried. The CF fabric was used as an electrode hereinafter referred to as Q-1 after confirming by the difference of weight before and after the dipping that about 4% of 2-ethylanthraquinone was supported on the fabric.

In accordance with the teachings of a literature by Izoret, 5% of a redox poly (vinyl acetal) synthesized by reacting 2-formylanthraquinone with polyvinyl alcohol was dissolved in dimethyl sulfoxide. A CF fabric was dipped into the resulting solution for two minutes and vacuum-dried after being lifted up slowly. The CF fabric was used as an electrode hereinafter referred to as Q-2 after confirming by the difference of weight before and after the dipping that about 5% of 2-ethylanthraquinone was supported on the fabric.

Polyaniline was electrolytically polymerized over a CF fabric. Namely, a current of 20 mA was applied to a CF fabric used as an active electrode and a titanium-platinum plate used as a counter electrode in a solution containing 0.1 M aniline, 0.5 M sulfuric acid and 0.2 M sodium sulfate, under a nitrogen atmosphere for 20 minutes. The CF fabric was lifted up from the solution and rinsed with water. The CF fabric was dried at room temperature after being dipped into a solution of 0.1% sodium carbonate and then rinsed with water again. The resulting CF fabric was used as an electrode hereinafter referred to as A-1 after confirming by the difference of weight before and after the electrolytic polymerization that about 0.8% Polyaniline was supported on the CF fabric.

Evaluation of Sterilizing Performance

Various experiments were conducted using the electrodes Q-1, Q-2, A-1 and a graphite plate "EG-30X" manufactured by Nippon Carbon Co., Ltd. and the same water-soluble cutting oil as that used in Example 1. The apparatus shown in FIG. 5 was used and an anode was one in the form of a titanium-platinum plate. The same diaphragm as that of the apparatus in Example 1 was used. A buffer solution of 10% sodium dihydrogenphosphate-potassium dihydrogen-phospahte (pH 9.0) was charged into the anode section. The cutting oil was supplied to the apparatus at a flow rate of 1 L per minute and a voltage of 1.2 V was applied to the electrodes continuously.

As shown in Table 1, the colony forming unit of each of the cutting oils was reduced to almost 0 on and after three days and the sterilizing effect was retained for more than one month.

It was observed that the performances of each of the cutting oils were not changed as shown in Table 2.

TABLE 1

| Type of Cathode | | 0 days | 3 days | 10 days | 20 days | 30 days | 40 days |
|---|---|---|---|---|---|---|---|
| | | Colony forming unit per 1 g | | | | | |
| Example 2 | | $3 \times 10^3$ | 10 | 10 | 0 | 0 | 0 |
| | Q-1 | $8 \times 10^3$ | 10 | 0 | 0 | 0 | 0 |
| | Q-2 | $1 \times 10^4$ | 0 | 0 | 0 | 0 | 0 |
| | A-1 | $5 \times 10^3$ | 10 | 0 | 0 | 0 | 0 |
| Comparative Example 2 | Titanium-platinum | $1 \times 10^3$ | 0 | 0 | 0 | 0 | 0 |
| | (None) | $1 \times 10^3$ | $10^5$ or more | $10^5$ or more | $10^5$ or more | $10^5$ or more | $10^5$ or more |

TABLE 2

| | | | | Evaluation Test of Deterioration | | | |
|---|---|---|---|---|---|---|---|
| | | | | | | Rust Preventing Characteristics[3] | |
| Cathode type | | PH | Emulsion Stability[1] | Foaming tendency[2] | | 48 hours | 96 hours |
| Example 2 | Graphite | 8.6 | ○ | ○ | | ○ | ○ |
| | Q-1 | 8.6 | ○ | ○ | | ○ | ○ |
| | Q-2 | 8.5 | ○ | ○ | | ○ | ○ |
| | A-1 | 8.6 | ○ | ○ | | ○ | ○ |
| Comparative Example 2 | Titanium-platinum | 7.8 | x | x | | x | x |
| | (None) | 7.4 | ○ | ○ | | ○ | x |

[1]In accordance with "Emulsion Stability Test" 5.4.2 in JIS K2241-1986 "Cutting Oil" (○: separation (oil + cream) in an amount of less than 2.5 ml, x: separation (oil + cream) in an amount of 2.5 ml or more)
[2]In accordance with "Foaming Test" 5.4.7 in JIS K2241-1986 "Cutting Oil" (○: foaming amount of less than 1 ml, x: foaming amount of more than 1 ml)
[3]In accordance with "Metal Corrosion Test" 5.4.8 in JIS K2241-1986 "Cutting Oil", provided that the results was obtained after the lubricants being left standing not only for 48 hours but also 96 hours.

COMPARATIVE EXAMPLE 2

The sterilization of the same cutting oil as that used in Example 1 was conducted using the apparatus shown in FIG. 5 and a titanium-platinum plate both for the anode and the cathode. A buffer solution of 10% sodium dihydrogenphosphate-potassium dihydrogenphospahte (pH 9.0) was charged into the anode section. The same cutting oil as that of Example 1 was supplied to the apparatus at a flow rate of 1 L per minute and a voltage of 1.2 V was continuously applied to the electrodes.

As shown in Table 1, the colony forming unit of the cutting oil was reduced to almost 0 on and after three days and the sterilization effect was retained for more than one month. However, the performances of the cutting oil were deteriorated substantially and unsuitably.

EXAMPLE 3

An experiment was conducted using a graphite plate "EG-30X" manufactured by Nippon Carbon Co., Ltd. as a cathode and a titanium-platinum plate as an anode and a water-soluble cutting oil "UNISOLUBLE EM-L" which is manufactured by Nisseki Mitsubishi Oil Company, diluted 10 times. The apparatus shown in FIG. 6 was used so as to introduce the cutting oil intermittently. The same diaphragm as that in Example 1 was used. A buffer solution of 10% sodium dihydrogenphosphate-potassium dihydrogenphospahte (pH 9.0) was charged into the anode section. The cutting oil was introduced into the apparatus at a flow rate of 1 L per minute and intervals of 10 hours only for 1 hour and a voltage of 2.0 V was applied to the electrodes. The cutting oil was kept at a temperature of 30° C. and 1% of corn flour and of particulated cast iron were added thereto before the application of voltage.

As shown in table 3, even after more than one month, it was found that no molds adhered to the electrode and thus the sterilization effect was retained.

TABLE 3

| | Colony forming unit per 1 g | | | | | | |
|---|---|---|---|---|---|---|---|
| Sterilizing Apparatus | 0 days | 3 days | 7 days | 14 days | 21 days | 28 days | 35 days |
| Fig. 6 | $4 \times 10^3$ | 10 | 0 | 0 | 0 | 0 | 0 |

EXAMPLE 4

The apparatus shown in FIG. 7 was assembled using a titanium platinum plate as an anode, a CF fabric as a cathode and a commercially available product "Durapore® Membrane Filter WLP 14250" which is poly vinylidene fluoride-based and manufactured by MILLIPORE Co., Ltd. as a diaphragm. A solution of 5% sodium hydroxide was charged into the anode section. Various water-soluble cutting oils were each supplied to the apparatus at a flow rate of 1 L per minute. The apparatus was adjusted to supply the cutting oil into the sterilization section at a flow rate of 1 L per minute and intervals of 10 hours only for 1 hour. A voltage of 2.0 V was applied to the electrodes and the polarity was reversed only for 1 hour every 23 hours.

The cutting oils used were "UNISOLUBLE EM-L" and "UNISOLUBLE EM-B" both of which are of emulsion type in JIS W1 class and manufactured by Nisseki Mitsubishi Oil Company, diluted 10 times and "UNISOLUBLE SB" and "UNISOLUBLE SC" both of which are of soluble type in JIS W2 class and manufactured by Nisseki Mitsubishi Oil Co., Ltd., diluted 30 times. Each of the cutting oils was kept at a temperature of 30° C. Before the application of voltage, 10% of corn flour and of particulated cast iron were added to each of the cutting oils for the purpose of putrefying them.

As a result of this, the proliferation of microorganisms did not occur in any of these cutting oils even after more than two months passed. After conducting the evaluation test of the rust preventing characteristics of the cutting oil in accordance with "Metal Corrosion Test" 5. 4. 8 prescribed in JIS K2241-1986 "Cutting Oil", none of the cutting oils discolors on any of the metal plates (steel, copper, and aluminum plates).

COMPARATIVE EXAMPLE 3

The anode section was removed from the apparatus of FIG. 7 and only the anode plate was arranged in the center between the cathodes. Each of the cutting oils used in Example 4 was supplied to the apparatus at a flow rate of 1 L per minute. The apparatus was adjusted so as to supply the cutting oil into the sterilization section at a flow rate of 1 L per minute and intervals of 10 hours only for one hour. A voltage of 2.0 V was applied to the electrodes and the polarity was reversed only for 1 hour every 23 hours.

After conducting the sterilization of each of the cutting oils under the same conditions as those of Example 4, the colony forming unit of each of the cutting oils was examined after one month. More than $10^5$ units/ml of colony forming unit were detected in each of the cutting oils. All of them were found to be putrefied.

EXAMPLE 5

Figure 11:
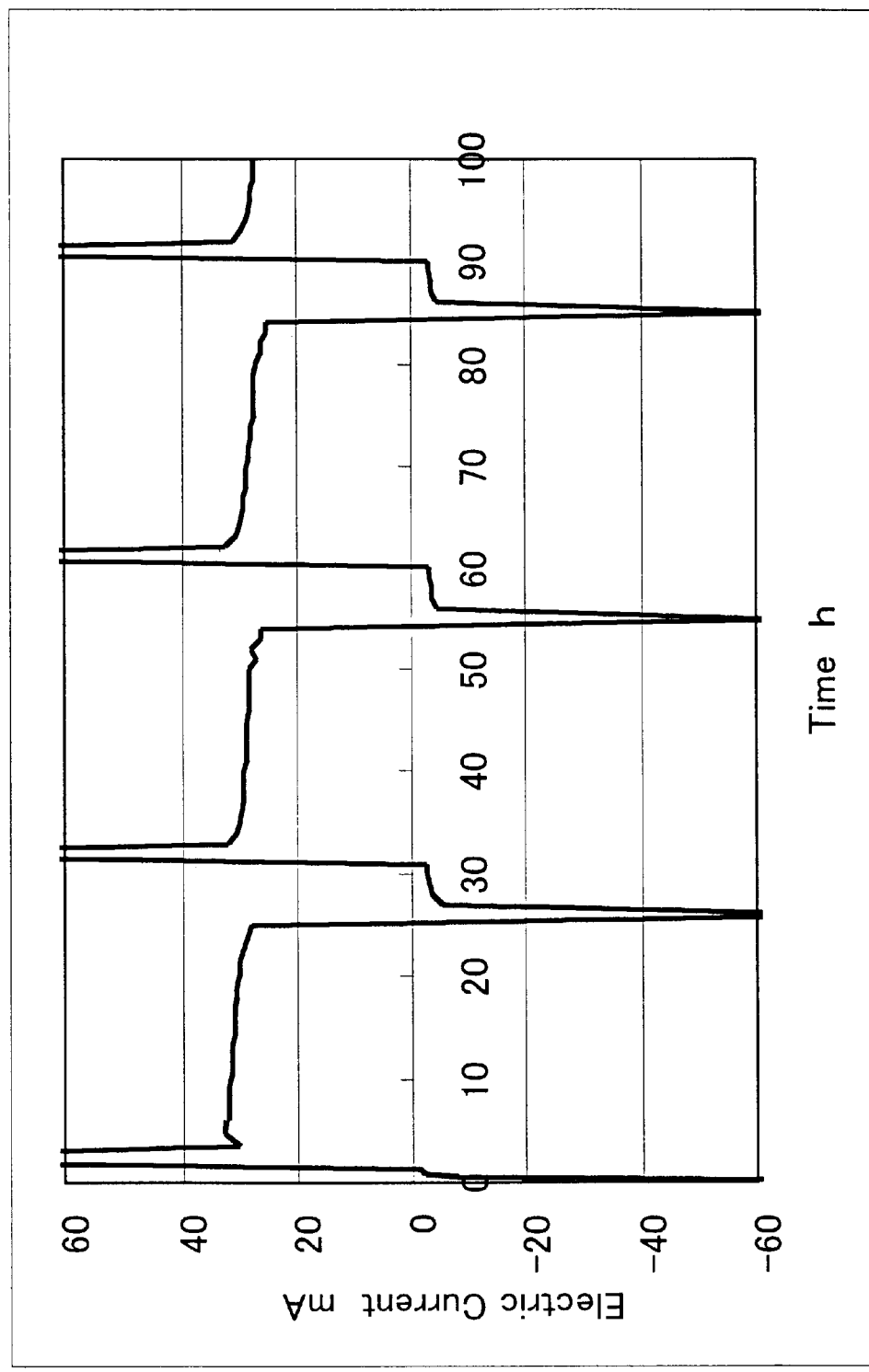
FIG. 11 is a graph showing the relationship between electric current and time.
Figure 12:
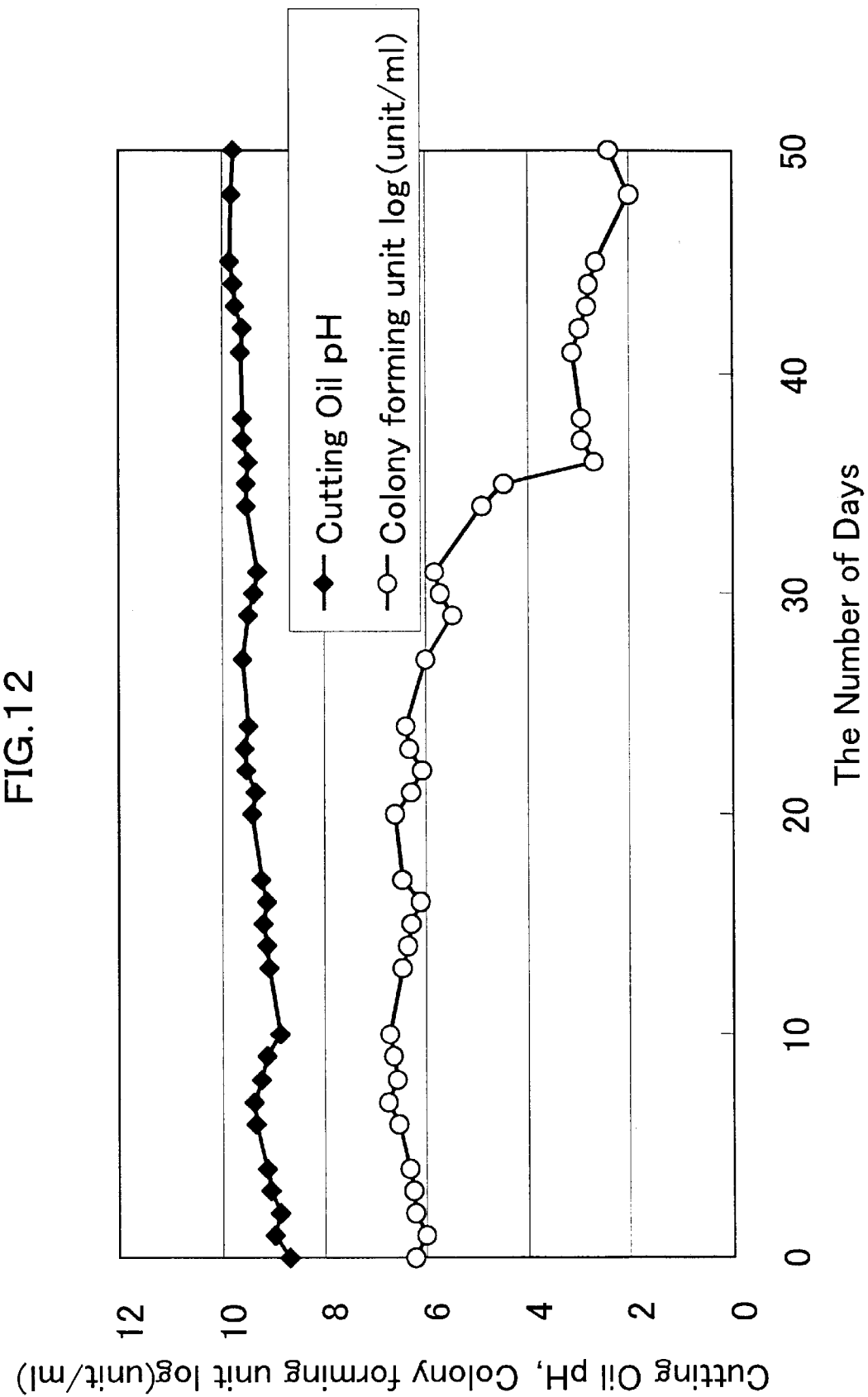
FIG. 12 is a graph showing the relationship between pH, colony forming unit and the number of days.

The apparatus shown in FIG. 7 was assembled using a titanium platinum plate as an anode, a graphite plate "EG-30X" manufactured by Nippon Carbon Co., Ltd as a cathode and a commercially available product "Durapore® Membrane Filter WLP 14250" which is poly vinylidene fluoride-based and manufactured by MILLIPORE Co., Ltd. as a diaphragm. A solution of 5% sodium hydroxide was charged into the anode section. A lubricant "UNISOLUBLE EM-L" which had been used in a machining factory and thus putrefied (colony forming unit: more than $10^7$ units/ml) was supplied to the apparatus at a flow rate of 1 L per minute. The apparatus was adjusted so as to supply the cutting oil into the sterilization section at a flow rate of 1 L per minute and intervals of 5 hours only for one hour. A voltage of 2.0 V was applied to the electrodes and the polarity was reversed only for 1 hour every 23 hours as shown in FIG. 11. As a result of this, the current value was almost constant and the colony forming unit was reduced to $10^5$ units/ml after about 30 days passed as shown in FIG. 12.

As described above, according to the present invention, an sterilization apparatus can be obtained which can perform a stable sterilization and suppress the proliferation of microorganisms without adversely affecting a water-soluble lubricant and thus is economically advantageous.

What is claimed is:

1. A method for sterilizing a water-soluble lubricant by employing an apparatus for generating a sterilizing substance, the apparatus comprising a container in which carbon-based electrodes forming an anode and a cathode are arranged and supplied with a voltage, a partition being arranged so as to divide said container into a cathode section and an anode section, and a diaphragm provided in at least a portion of said partition such that an electric current flows between said anode and said cathode, the method comprising the steps of:

(a) introducing into the cathode section the water-soluble lubricant, and into the anode section an electrically conductive material selected from the group consisting of an alkaline buffer solution, an alkaline aqueous solution and solid materials thereof;

(b) passing an electric current between said anode and said cathode, so as to generate the sterilizing substance from the cathode; and (c) sterilizing the lubricant continuously within the cathode section with the sterilizing substance.

2. The method according to claim 1, wherein said cathode is an electrode supporting a redox resin or at least one organic compound having an oxidation-reduction capability.

3. The method according to claim 2, wherein said organic compound is selected from the group consisting of benzoquinone, naphthoquinone, anthraquinone and anthraquinone derivatives.

4. The method according to claim 2, wherein said redox resin is a quinone-based redox resin or polyaniline.

5. The method according to claim 1, wherein said cathode section is provided with an inlet port for introducing the water-soluble lubricant and an outlet port for discharging the sterilized water-soluble lubricant.

6. The method according to claim 1, wherein said cathode section is provided with a separator for separating impurities by specific gravity from the water-soluble lubricant.

7. The method according to claim 1, wherein said electrically conductive material is an alkaline buffer solution or an alkaline aqueous solution.

8. The method according to claim 1, wherein the cathode section has two cathodes which are arranged opposing each other, and the anode section has an anode which is arranged so as to be located between the cathodes, at least portions of the partition being positioned between the anode and each of the cathodes and being provided with a diaphragm such that an electric current flows between said cathode and said anode.

9. The method according to claim 1, wherein said sterilizing substance is hydrogen peroxide.

10. The method according to claim 1, wherein said water-soluble lubricant is a metal machining oil for industrial use selected from the group consisting of cutting oil, grinding oil, drawing and ironing oils, hydraulic oil and gear coupling oil.

* * * * *